(12) United States Patent
Kim (10) Patent No.: US 11,897,466 B2
(45) Date of Patent: Feb. 13, 2024

(54) APPARATUS FOR CONTROLLING A VEHICLE, A SYSTEM HAVING THE SAME, AND A METHOD THEREOF

(71) Applicants: HYUNDAI MOTOR COMPANY, Seoul (KR); KIA CORPORATION, Seoul (KR)

(72) Inventor: Hee Gwon Kim, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 237 days.

(21) Appl. No.: 17/477,041

(22) Filed: Sep. 16, 2021

(65) Prior Publication Data

US 2022/0324446 A1  Oct. 13, 2022

(30) Foreign Application Priority Data

Apr. 7, 2021  (KR) .................. 10-2021-0045432

(51) Int. Cl.
*B60W 30/14* (2006.01)
*B60W 30/18* (2012.01)

(52) U.S. Cl.
CPC .... *B60W 30/143* (2013.01); *B60W 30/18072* (2013.01); *B60W 2520/10* (2013.01); *B60W 2552/15* (2020.02); *B60W 2552/40* (2020.02)

(58) Field of Classification Search
CPC ......... B60W 30/143; B60W 30/18072; B60W 2552/40; B60W 2552/15; B60W 2520/10
See application file for complete search history.

(56) References Cited

U.S. PATENT DOCUMENTS

| | | | | |
|---|---|---|---|---|
| 10,906,549 | B2* | 2/2021 | Wu | B60W 30/16 |
| 2018/0111618 | A1* | 4/2018 | Morimoto | F02D 41/10 |
| 2018/0222483 | A1* | 8/2018 | Yoon | B60W 30/143 |
| 2019/0100208 | A1* | 4/2019 | Plianos | F02D 29/02 |
| 2019/0100209 | A1* | 4/2019 | Plianos | B60W 50/14 |
| 2019/0184996 | A1* | 6/2019 | Follen | B60W 30/143 |
| 2019/0277640 | A1* | 9/2019 | Nelapati | G01C 21/3896 |
| 2019/0367032 | A1* | 12/2019 | Ito | B60W 50/00 |
| 2020/0164879 | A1* | 5/2020 | Lee | B60W 10/10 |
| 2021/0107537 | A1* | 4/2021 | Ross | B61L 25/025 |

* cited by examiner

*Primary Examiner* — Jeff A Burke
*Assistant Examiner* — Mohamad O El Sayah
(74) *Attorney, Agent, or Firm* — Lempia Summerfield Katz LLC (57) ABSTRACT

A vehicle control apparatus may include: a profile generator that generates at least one speed profile including a hysteresis section, in which deceleration and acceleration due to coasting of a vehicle are repeated, based on an environmental condition of the vehicle; a profile selector that selects a speed profile, which satisfies a predetermined condition, from among the at least one speed profile; and a controller that controls a speed of the vehicle depending on the speed profile selected by the profile selector.

20 Claims, 7 Drawing Sheets

APPARATUS FOR CONTROLLING A VEHICLE, A SYSTEM HAVING THE SAME, AND A METHOD THEREOF

CROSS-REFERENCE TO RELATED APPLICATION

This application claims the benefit of priority to Korean Patent Application No. 10-2021-0045432, filed in the Korean Intellectual Property Office on Apr. 7, 2021, the entire contents of which are incorporated herein by reference.

TECHNICAL FIELD

The present disclosure relates to a vehicle control apparatus, a system including the same, and a method thereof.

BACKGROUND

Generally, a vehicle is driving based on a speed limit for each section in autonomous driving without a driver's intervention. In addition, several driving profiles (patterns) are generated to determine a longitudinal driving speed during autonomous driving and one profile is selected from among the several driving profiles. In the meantime, no matter which route a vehicle selects in a downtown area, the speed limit should typically not exceed 50 km/h (about 30 mph). Accordingly, after the vehicle's current speed reaches the maximum speed of 50 km/h when the vehicle is autonomously driving in a downtown area, there is only a speed hold mode or a braking mode in which the vehicle is capable of traveling.

In particular, accident risk and the driver's discomfort may occur when there is a need for sudden braking due to too high of a speed in a section where the vehicle needs to be stopped, due to performance deterioration of a sensor, or the like. Moreover, when accurate information about a front object in a lane in a direction in which the vehicle is driving is given in real time, it is possible to determine optimal longitudinal driving. However, there is still a risk when a situation ahead is constantly changing and errors of a sensor occur.

SUMMARY

The present disclosure has been made to solve the above-mentioned problems occurring in the prior art while advantages achieved by the prior art are maintained intact.

An aspect of the present disclosure provides a vehicle control apparatus that is capable of implementing a longitudinal driving pattern similar to an actual driving pattern of a driver, preventing sudden braking of a vehicle due to errors of a sensor, and improving riding comfort by performing speed control including coasting during a specific time when information about a forward situation of an autonomously-driving vehicle is insufficient. The present disclosure also provides a system including the same and a method thereof.

Furthermore, an aspect of the present disclosure provides a vehicle control apparatus that is capable of improving fuel economy by including a hysteresis section in the autonomous-driving region of a vehicle, a system including the same, and a method thereof.

The technical problems to be solved by the present inventive concept are not limited to the aforementioned problems. Any other technical problems not mentioned herein should be clearly understood from the following description by those having ordinary skill in the art to which the present disclosure pertains.

According to an aspect of the present disclosure, a vehicle control apparatus may include a profile generator that generates at least one speed profile including a hysteresis section, in which deceleration and acceleration due to coasting of a vehicle are repeated, based on an environmental condition of the vehicle. The vehicle control apparatus may also include a profile selector that selects a speed profile, which satisfies a predetermined condition, from among the at least one speed profile. The vehicle control apparatus may also include a controller that controls a speed of the vehicle depending on the speed profile selected by the profile selector.

In an embodiment, the hysteresis section may be a section in which deceleration and acceleration are repeated between a first speed limit and a second speed limit less than the first speed limit.

In an embodiment, the environmental condition of the vehicle may include object information around the vehicle, location information of the vehicle, and map information.

In an embodiment, the profile generator may generate the speed profile so as to satisfy a speed limit condition set depending on surrounding situations of the vehicle.

In an embodiment, the profile generator may generate the speed profile when an object is not present within a reference distance in front of the vehicle.

In an embodiment, the profile generator may generate the speed profile when the vehicle reaches a reference speed.

In an embodiment, the profile generator may generate the speed profile in consideration of acceleration due to at least one of a rolling resistance, an air resistance, or a gradient resistance of the vehicle.

In an embodiment, the profile selector may select a speed profile, in which the vehicle is driving with minimum acceleration, from among the at least one speed profile.

In an embodiment, the controller may terminate speed control according to the selected speed profile when the vehicle reaches a reference speed.

According to an aspect of the present disclosure, a vehicle system may include a sensor that detects an object around a vehicle. The vehicle system may also include an information acquisition device that obtains map information and a location of the vehicle. The vehicle system may also include a vehicle control apparatus that controls a speed of the vehicle depending on a speed profile, which is selected to satisfy a predetermined condition, from among at least one speed profile generated to include a hysteresis section in which acceleration and deceleration due to coasting of the vehicle are repeated, based on an environmental condition of the vehicle.

In an embodiment, the sensor may obtain state information of the vehicle.

In an embodiment, the information acquisition device may obtain the map information and the location of the vehicle from an external server.

According to an aspect of the present disclosure, a method of controlling a vehicle may include generating at least one speed profile including a hysteresis section, in which deceleration and acceleration due to coasting of the vehicle are repeated, based on an environmental condition of the vehicle. The method may also include selecting a speed profile, which satisfies a predetermined condition, from among the at least one speed profile. The method may also include controlling a speed of the vehicle depending on the selected speed profile.

In an embodiment, the hysteresis section may be a section in which deceleration and acceleration are repeated between a first speed limit and a second speed limit less than the first speed limit.

In an embodiment, the environmental condition of the vehicle may include object information around the vehicle, location information of the vehicle, and map information.

In an embodiment, the generating of the at least one speed profile may include generating the speed profile so as to satisfy a speed limit condition set depending on surrounding situations of the vehicle.

In an embodiment, the generating of the at least one speed profile may include generating the speed profile when an object is not present within a reference distance in front of the vehicle.

In an embodiment, the generating of the at least one speed profile may include generating the speed profile when the vehicle reaches a reference speed.

In an embodiment, the generating of the at least one speed profile may include generating the speed profile in consideration of acceleration due to at least one of a rolling resistance, an air resistance, or a gradient resistance of the vehicle.

In an embodiment, the selecting of the speed profile may include selecting a speed profile, in which the vehicle is driving with minimum acceleration, from among the at least one speed profile.

BRIEF DESCRIPTION OF THE DRAWINGS

The above and other objects, features, and advantages of the present disclosure should be more apparent from the following detailed description taken in conjunction with the accompanying drawings.

DETAILED DESCRIPTION

Hereinafter, some embodiments of the present disclosure are described in detail with reference to the drawings. In adding the reference numerals to the components of each drawing, it should be noted that the identical or equivalent component is designated by the identical numeral even when they are displayed on other drawings. Further, in describing the embodiment of the present disclosure, a detailed description of well-known features or functions has been omitted in order not to unnecessarily obscure the gist of the present disclosure.

In describing the components of the embodiment according to the present disclosure, terms such as first, second, "A", "B", (a), (b), and the like may be used. These terms are merely intended to distinguish one component from another component and the terms do not limit the nature, sequence or order of the constituent components. Unless otherwise defined, all terms used herein, including technical or scientific terms, have the same meanings as those generally understood by those having ordinary skill in the art to which the present disclosure pertains. Such terms as those defined in a generally used dictionary are to be interpreted as having meanings consistent with the contextual meanings in the relevant field of art. Such terms are not to be interpreted as having ideal or excessively formal meanings unless clearly defined as having such in the present application. When a component, device, element, or the like of the present disclosure is described as having a purpose or performing an operation, function, or the like, the component, device, or element should be considered herein as being "configured to" meet that purpose or to perform that operation or function.

Hereinafter, various embodiments of the present disclosure are described in detail with reference to FIGS. 1-7.

Figure 1:
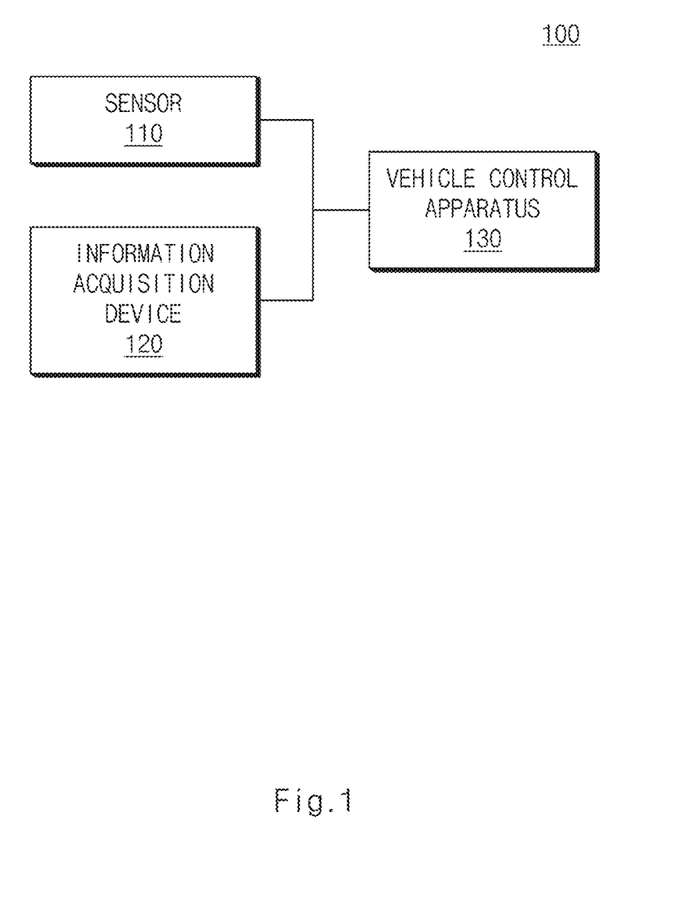
FIG. 1 is a block diagram illustrating a configuration of a vehicle system including a vehicle control apparatus, according to an embodiment of the present disclosure.

FIG. 1 is a block diagram illustrating a configuration of a vehicle system including a vehicle control apparatus, according to an embodiment of the present disclosure.

Referring to FIG. 1, a vehicle control apparatus 130 according to an embodiment of the present disclosure may be implemented inside a vehicle. At this time, the vehicle control apparatus 130 may be integrally formed with internal control units of the vehicle. In another embodiment, the vehicle control apparatus 130 may be implemented as a separate apparatus so as to be connected to the control units of the vehicle by a separate connection means.

Referring to FIG. 1, a vehicle system 100 according to an embodiment of the present disclosure may include a sensor 110, an information acquisition device 120, and the vehicle control apparatus 130.

The sensor 110 may detect objects around a vehicle. In other words, the sensor 110 may detect the distance and relative speed of an object (e.g., a forward vehicle, a sign, an obstacle, and the like) in front of the vehicle. For example, the sensor 110 may include a camera, radar, and LiDAR.

Moreover, the sensor 110 may include state information of various actuators of the vehicle. For example, the state information of an actuator of the vehicle may include the vehicle's speed, acceleration, angular velocity, and the like.

The information acquisition device 120 may obtain map information or a location of the vehicle. For example, the information acquisition device 120 may obtain current location information of the vehicle through Global Positioning System ("GPS") and may obtain information such as the curvature of a road, on which the vehicle is driving, a current lane location of the vehicle, or the like. In this case, the information acquisition device 120 may store map information in separate storage (not shown) or may receive map information or location information of the vehicle from an external server through a communication device (not shown).

The vehicle control apparatus 130 may generate various profiles associated with a driving pattern of the vehicle and may perform operations such as various calculations, determinations, and the like. In an embodiment, the vehicle control apparatus 130 may generate a speed profile based on an environmental condition of the vehicle so as to include a hysteresis section, in which deceleration and acceleration due to coasting of the vehicle are repeated. Also, the vehicle control apparatus 130 may select a speed profile, which satisfies a predetermined condition, from among at least one generated speed profile and may control the speed of the vehicle depending on the selected speed profile. The detailed configuration of the vehicle control apparatus 130 is described below in detail with reference to FIG. 2.

As such, the vehicle system 100 according to an embodiment of the present disclosure may obtain various pieces of information such as a map, an object around an autonomously-driving vehicle, or the like through the sensor 110 and the information acquisition device 120. The vehicle system 100 may also perform driving depending on a profile suitable for situations and conditions based on the obtained information.

In an embodiment, when information about the front is insufficient in a lot of situations for determining a driving operation (e.g., when the sensitivity or effectiveness of a sensor is limited because the sensor is covered by a large car, when the determination of other risks is delayed due to calculation of region of interest (ROI), or the like), the vehicle system 100 according to an embodiment of the present disclosure may perform coasting by temporarily eliminating a driving torque of a vehicle.

As such, the vehicle system 100 according to an embodiment of the present disclosure may prevent sudden braking from occurring due to an error in a sensor and may increase the riding comfort of a passenger. Also, it is possible to improve the fuel efficiency of the vehicle by including the hysteresis section during autonomous driving.

Figure 2:
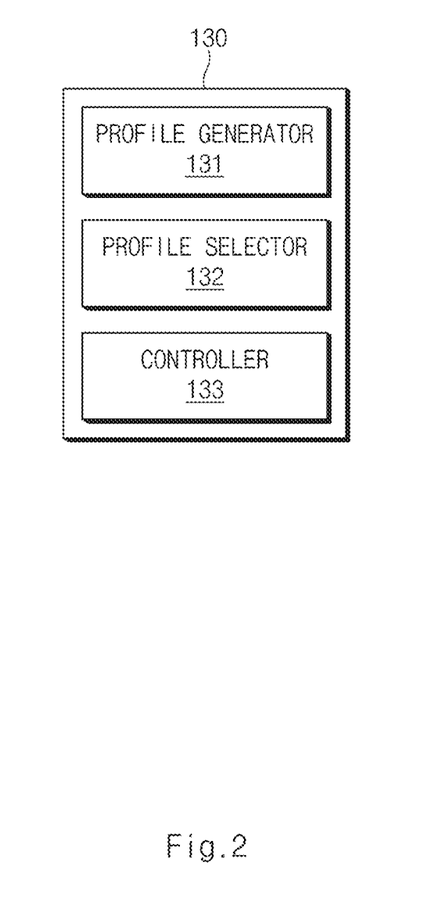
FIG. 2 is a block diagram illustrating a configuration of a vehicle control apparatus, according to an embodiment of the present disclosure.

FIG. 2 is a block diagram illustrating a configuration of a vehicle control apparatus, according to an embodiment of the present disclosure.

Referring to FIG. 2, the vehicle control apparatus 130 according to an embodiment of the present disclosure may include a profile generator 131, a profile selector 132, and a controller 133.

The vehicle control apparatus 131 may generate at least one speed profile including a hysteresis section, in which deceleration and acceleration due to coasting of a vehicle are repeated, based on an environmental condition of the vehicle. At this time, the hysteresis section may be a section in which deceleration and acceleration are repeated between an upper limit speed (a first speed limit) and a lower limit speed (a second speed limit).

For example, the environmental condition of the vehicle may include object information around the vehicle, location information of the vehicle, and map information. At this time, the object information around the vehicle may be obtained by the sensor 110 of FIG. 1. The location information of the vehicle and the map information may be obtained through the information acquisition device 120 of FIG. 1.

The profile generator 131 may generate a speed profile so as to satisfy a speed limit condition set depending on surrounding situations of the vehicle. At this time, the profile generator 131 may set the speed limit condition based on various situations such as a preceding vehicle, a speed limit in a road, a vehicle crossing at the intersection, and/or a lane change.

The profile generator 131 may generate a speed profile when an object is not present within a reference distance (e.g., 30 m) in front of the vehicle. Furthermore, the profile generator 131 may generate a speed profile when the vehicle reaches the reference speed. And, the profile generator 131 may generate a speed profile in consideration of acceleration due to at least one of a rolling resistance, an air resistance, or a gradient resistance of the vehicle.

In an embodiment, when it is determined to generate a speed profile including a hysteresis section, the profile generator 131 may set necessary conditions for the speed profile. In an embodiment, coasting refers to a method of driving with inertia in an unpowered state. Accordingly, the output torque of a sub-controller of the vehicle system 100 needs to be controlled to 0 Nm for the purpose of changing the driving state of the vehicle into an unpowered driving state. Accordingly, the profile generator 131 may output the speed profile to ensure that the output torque of the sub-controller is similar to 0 Nm.

Moreover, the profile generator 131 may calculate the acceleration required for the speed profile in consideration of a driving force of the vehicle and various resistances (e.g. a rolling resistance, an air resistance, a gradient resistance, or the like) applied to the vehicle. For example, the profile generator 131 may calculate the acceleration for coasting of a speed profile by subtracting the acceleration due to various resistances such as the rolling resistance, the air resistance, the gradient resistance, or the like from the initial acceleration (e.g., 0 m/s$^2$) of the speed profile.

The profile selector 132 may select a speed profile, which satisfies a predetermined condition, from among at least one speed profile. For example, the profile selector 132 may select a speed profile, in which the vehicle is driving with the minimum acceleration or with the minimum power, from among several speed profiles generated by the profile generator 131. However, the present disclosure is not limited thereto and a predetermined condition of the profile selector 132 may be set in consideration of various factors.

The controller 133 may control the speed of the vehicle depending on the speed profile selected by the profile selector 132. For example, when the vehicle reaches the reference speed, the controller 133 may perform speed control depending on the selected speed profile. Then, when the vehicle reaches a target lower limit speed, the controller 133 may terminate the speed control according to the selected speed profile. At this time, the controller 133 may output a point array according to a control value of the selected speed profile.

As such, a vehicle control apparatus according to an embodiment of the present disclosure may implement a longitudinal driving pattern similar to an actual driving pattern of a driver, may prevent sudden braking of the vehicle, and may improve riding comfort by performing speed control including coasting during a specific time when information about a forward situation of an autonomously-driving vehicle is insufficient.

In addition, the vehicle control apparatus 130 according to an embodiment of the present disclosure may improve fuel efficiency by including a hysteresis section in an autonomous driving region of the vehicle.

Figure 3:
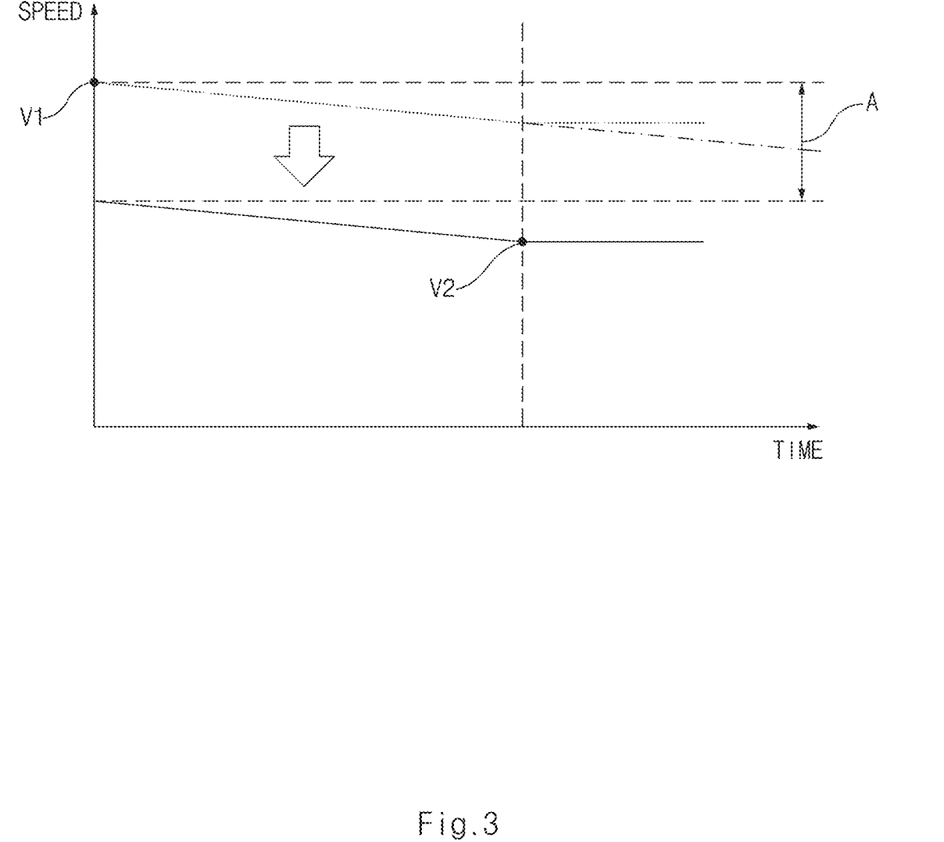
FIG. 3 is a view for describing an operating condition of a vehicle control apparatus, according to an embodiment of the present disclosure.

FIG. 3 is a view for describing an operating condition of a vehicle control apparatus, according to an embodiment of the present disclosure.

Referring to FIG. 3, a horizontal axis indicates time and a vertical axis indicates a speed of a vehicle. In addition, region A in FIG. 3 indicates an operating region of coasting. V1 indicates a reference speed at which control according to a speed profile of a vehicle is started. V2 indicates a target speed at which control according to the speed profile is terminated (i.e., a coasting release speed).

At this time, when the vehicle reaches the reference speed V1, the vehicle control apparatus 130 according to an embodiment of the present disclosure may perform speed control depending on a selected speed profile. Furthermore, when the vehicle reaches the set target speed V2, the vehicle control apparatus 130 may terminate (release) the speed control depending on the speed profile. Also, when the vehicle control apparatus 130 performs the speed control depending on the speed profile, the vehicle control apparatus 130 may perform the speed control so as to include a hysteresis section in the region A of FIG. 3.

In detail, when there is no in-path target within the set reference distance in front of the vehicle, and a current speed of the vehicle reaches the reference speed V1 (e.g., a road limit speed, a user set speed, or the like), the vehicle control apparatus 130 according to an embodiment of the present disclosure may generate a speed profile. In this case, the speed profile may be set to include a hysteresis section where deceleration and acceleration due to coasting are repeated.

Moreover, as the vehicle control apparatus 130 performs the speed control depending on the speed profile so as to include the hysteresis section, the speed profile may be moved downwardly as shown in FIG. 3. When the vehicle's speed reaches the target speed V2, the vehicle control apparatus 130 may release the speed control according to the speed profile.

Figure 4:
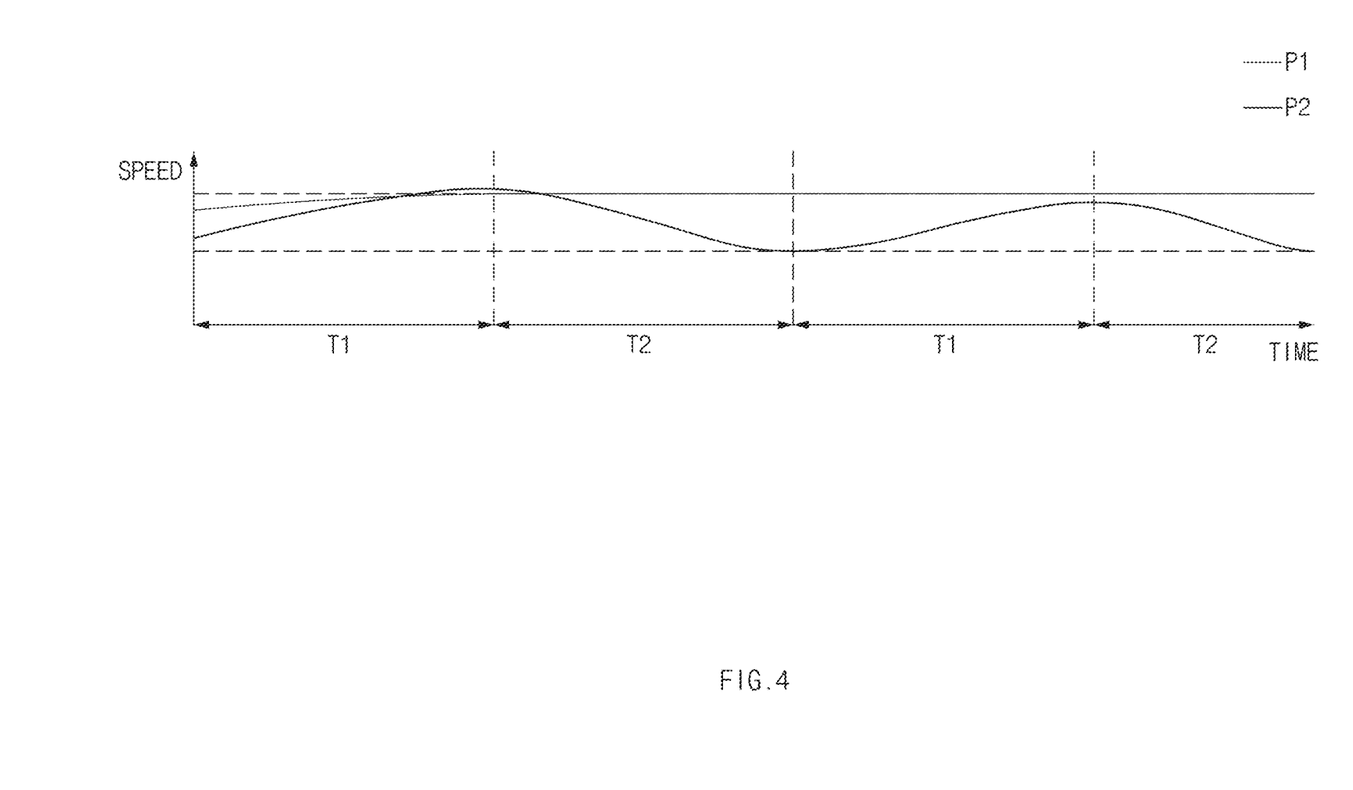
FIG. 4 is a view illustrating a speed profile including a hysteresis section of a vehicle control apparatus, according to an embodiment of the present disclosure.

FIG. 4 is a view illustrating a speed profile including a hysteresis section of a vehicle control apparatus, according to an embodiment of the present disclosure.

Referring to FIG. 4, a horizontal axis indicates time and a vertical axis indicates a speed of a vehicle. Also, as shown in FIG. 4, the vehicle control apparatus 130 according to an embodiment of the present disclosure may generate a speed profile so as to include a hysteresis section in which the vehicle's acceleration section and the vehicle's deceleration section are repeated depending on coasting. At this time, on a time axis of FIG. 4, T1 denotes an acceleration section according to coasting. T2 denotes a deceleration section according to coasting.

Meanwhile, in FIG. 4, graph P1 indicates a conventional driving method. As illustrated in FIG. 4, in the conventional autonomous driving apparatus, the hysteresis section is not included in the speed profile. The conventional autonomous driving apparatus may perform only speed control according to a specific target speed. Accordingly, because a vehicle maintains the set speed depending on a road speed limit when a current lane is maintained with no object in front of the vehicle being driven, a difference from a driver's manual operation may occur. In addition, when information about a forward situation is insufficient due to an error of a sensor, sudden braking may occur, which may make the driver feel uncomfortable.

On the other hand, as in graph P2 of FIG. 4, when there is no change in a forward situation (e.g., a state where there is no object in front is maintained), the vehicle control apparatus 130 according to an embodiment of the present disclosure may perform speed control according to the hysteresis section such that deceleration by coasting and acceleration to the upper limit speed are repeated. Accordingly, it is possible to generate a speed profile similar to a pattern of an actual driver's driving and to prevent sudden braking. Thus, riding comfort of the user may be increased.

Figure 5:
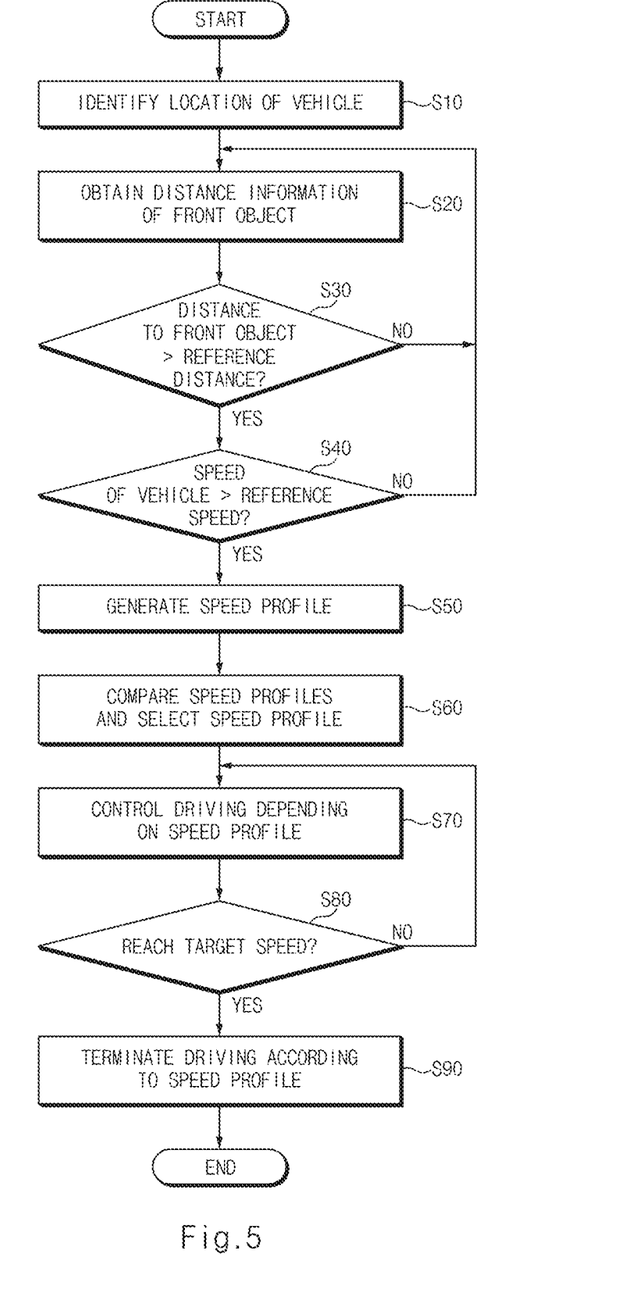
FIG. 5 is a flowchart illustrating an operation of a vehicle control apparatus, according to an embodiment of the present disclosure.

FIG. 5 is a flowchart illustrating an operation of a vehicle control apparatus, according to an embodiment of the present disclosure.

Referring to FIG. 5, above all, the vehicle control apparatus 130 according to an embodiment of the present disclosure identifies a current location of a vehicle by using GPS coordinates (S10). Furthermore, the vehicle control apparatus 130 obtains distance information of a front object (e.g., a preceding vehicle, an obstacle, or the like) (S20).

Moreover, the vehicle control apparatus 130 compares a distance to the front object with a reference distance (S30). When the distance to the front object is shorter than the reference distance (NO), a procedure returns to operation S20 again.

On the other hand, when the distance to the front object is not shorter than the reference distance in operation S30 (YES), the vehicle control apparatus 130 determines whether the current speed of the vehicle is not less than the preset reference speed (S40). When the current speed of the object is less than the reference speed (NO), the procedure returns to operation S20 again. On the other hand, when the current speed is not less than the reference speed (YES), the vehicle control apparatus 130 generates a speed profile including a hysteresis section where deceleration and acceleration according to coasting are repeated (S50).

And, when multiple speed profiles are generated, the vehicle control apparatus 130 compares the speed profiles with each other and then selects a speed profile that satisfies a preset condition (S60). In this case, the preset condition may include a condition that acceleration or power consumption is minimized among the plurality of profiles. Also, operation S60 may be performed when there is no unexpected situation (e.g., a cut-in object, an abnormal object, or the like) in a lane in which the vehicle is currently driving.

Next, the vehicle control apparatus 130 controls the speed of the vehicle depending on the selected speed profile (S70). In other words, the vehicle control apparatus 130 may drive a vehicle so as to decelerate the vehicle's speed to the lower limit speed depending on coasting and then to accelerate the vehicle's speed to the upper limit speed again. When the vehicle's speed reaches a target speed while the vehicle is driving depending on the speed profile (YES) (S80), the vehicle control apparatus 130 terminates the driving according to the speed profile (S90).

Figure 6:
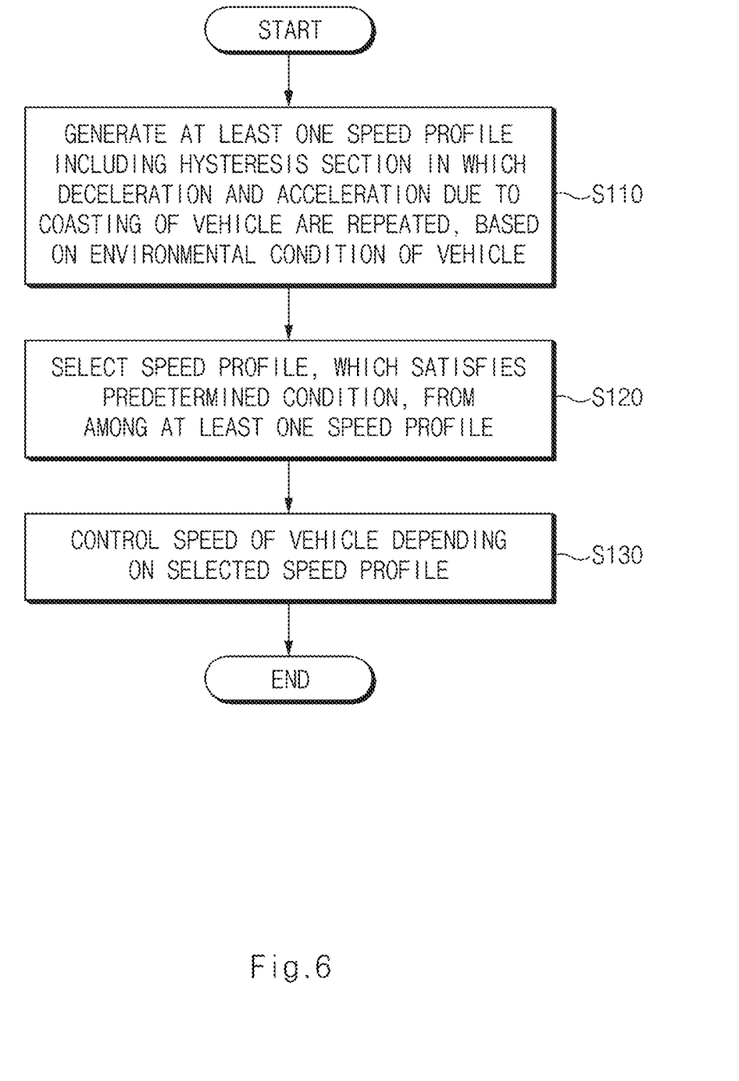
FIG. 6 is a flowchart illustrating a vehicle controlling method, according to various embodiments of the present disclosure.

Hereinafter, a vehicle controlling method according to an embodiment of the present disclosure is described in detail with reference to FIG. 6. FIG. 6 is a flowchart for describing a vehicle controlling method, according to an embodiment of the present disclosure.

Hereinafter, it is assumed that the vehicle control apparatus 130 of FIG. 1 or FIG. 2 performs the process of FIG. 6. In addition, in a description of FIG. 6, it may be understood that an operation described as being performed by a device is controlled by a processor (not illustrated) of the vehicle control apparatus 130.

Referring to FIG. 6, above all, the vehicle controlling method according to an embodiment of the present disclosure may generate at least one speed profile including a hysteresis section in which deceleration and acceleration due to coasting of a vehicle are repeated, based on an environmental condition of the vehicle (S110). At this time, the hysteresis section may be a section in which deceleration and acceleration are repeated between an upper limit speed (a first speed limit) and a lower limit speed (a second speed limit). Furthermore, the environmental condition of the vehicle may include object information around the vehicle, location information of the vehicle, and map information.

Moreover, in operation S110, the vehicle controlling method may generate a speed profile so as to satisfy a speed limit condition set depending on surrounding situations of the vehicle. At this time, the vehicle controlling method may set the speed limit condition based on various situations such as a preceding vehicle, a speed limit in a road, a vehicle crossing at the intersection, and a lane change.

In an embodiment, when an object is not present within a reference distance (e.g., 30 m) in front of the vehicle and the vehicle reaches the reference speed, in operation S110, the vehicle controlling method may generate the speed profile. Also, the vehicle controlling method may generate the speed profile in consideration of acceleration due to at least one of a rolling resistance, an air resistance, or a gradient resistance of the vehicle.

Next, the vehicle controlling method may select a speed profile, which satisfies a predetermined condition, from among at least one speed profile (S120). For example, in operation S120, the vehicle controlling method may select a speed profile, in which the vehicle is driving with the minimum acceleration or with the minimum power, from among a plurality of speed profiles.

In addition, the vehicle controlling method may control the speed of the vehicle depending on the selected speed profile (S130). For example, in operation S130, the vehicle controlling method may perform speed control depending on the selected speed profile when the vehicle reaches the reference speed. The vehicle controlling method then may terminate the speed control according to the selected speed profile when the vehicle reaches a target lower limit speed. At this time, the vehicle controlling method may output a point array according to a control value of the selected speed profile.

As such, the vehicle controlling method may according to an embodiment of the present disclosure may implement a longitudinal driving pattern similar to an actual driving pattern of a driver, may prevent sudden braking of the vehicle, and may improve riding comfort by performing speed control including coasting during a specific time when information about a forward situation of an autonomously-driving vehicle is insufficient.

In addition, the vehicle controlling method according to an embodiment of the present disclosure may improve fuel efficiency by including a hysteresis section in an autonomous driving region of the vehicle.

Figure 7:
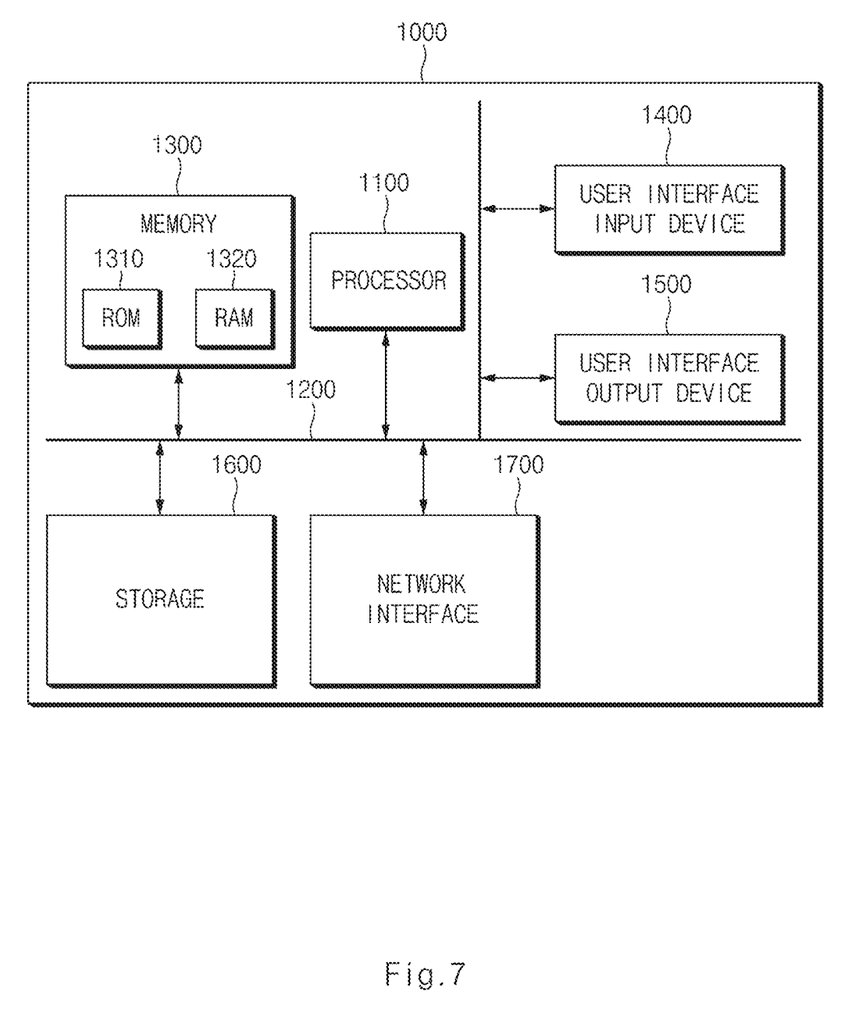
FIG. 7 illustrates a computing system according to an embodiment of the present disclosure.

FIG. 7 illustrates a computing system, according to an embodiment of the present disclosure.

Referring to FIG. 7, a computing system 1000 may include at least one processor 1100, a memory 1300, a user interface input device 1400, a user interface output device 1500, storage 1600, and a network interface 1700, which are connected with each other via a bus 1200.

The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a read only memory (ROM) and a random access memory (RAM).

Thus, the operations of the method or the algorithm described in connection with the embodiments disclosed herein may be embodied directly in hardware or a software module executed by the processor 1100, or in a combination thereof. The software module may reside on a storage medium (i.e., the memory 1300 and/or the storage 1600) such as a RAM, a flash memory, a ROM, an EPROM, an EEPROM, a register, a hard disk, a removable disk, and a CD-ROM.

The storage medium may be coupled to the processor 1100 and the processor 1100 may read information out of the storage medium and may record information in the storage medium. Alternatively, the storage medium may be integrated with the processor 1100. The processor and the storage medium may reside in an application specific integrated circuit (ASIC). The ASIC may reside within a user terminal. In another case, the processor and the storage medium may reside in the user terminal as separate components.

Hereinabove, although the present disclosure has been described with reference to embodiments and the accompanying drawings, the present disclosure is not limited thereto. The embodiments and present disclosure may be variously modified and altered by those having ordinary skill in the art to which the present disclosure pertains without departing from the spirit and scope of the present disclosure claimed in the following claims.

Therefore, the embodiments of the present disclosure are provided to explain the spirit and scope of the present disclosure, but not to limit them, so that the spirit and scope of the present disclosure is not limited by the embodiments. The scope of the present disclosure should be construed on the basis of the accompanying claims and all the technical ideas within the scope equivalent to the claims should be included in the scope of the present disclosure.

According to an embodiment of the present disclosure, a vehicle control apparatus, a system including the same, and a method thereof may implement a longitudinal driving pattern similar to an actual driving pattern of a driver, may prevent sudden braking of a vehicle, and may improve riding comfort by performing speed control including coasting during a specific time when information about a forward situation of an autonomously-driving vehicle is insufficient.

Furthermore, according to an embodiment of the present disclosure, a vehicle control apparatus, a system including the same, and a method thereof may improve fuel efficiency by including a hysteresis section in an autonomous driving region of a vehicle.

In addition, a variety of effects directly or indirectly understood through the specification may be provided.

What is claimed is:

1. A vehicle control apparatus comprising:
a profile generator configured to generate at least one speed profile including a hysteresis section, in which deceleration and acceleration due to coasting of a vehicle are repeated, based on an environmental condition of the vehicle;
a profile selector configured to select a speed profile, which satisfies a predetermined condition, from among the at least one speed profile; and
a controller configured to control a speed of the vehicle depending on the speed profile selected by the profile selector,
wherein the controller performs speed control including the coasting during a specific time when information about a forward situation for an autonomous driving of the vehicle is insufficient.

2. The vehicle control apparatus of claim 1, wherein the hysteresis section is a section in which deceleration and acceleration are repeated between a first speed limit and a second speed limit less than the first speed limit.

3. The vehicle control apparatus of claim 1, wherein the environmental condition of the vehicle includes object information around the vehicle, location information of the vehicle, and map information.

4. The vehicle control apparatus of claim 1, wherein the profile generator generates the speed profile so as to satisfy a speed limit condition set depending on surrounding situations of the vehicle.

5. The vehicle control apparatus of claim 1, wherein the profile generator generates the speed profile when an object is not present within a reference distance in front of the vehicle.

6. The vehicle control apparatus of claim 1, wherein the profile generator generates the speed profile when the vehicle reaches a reference speed.

7. The vehicle control apparatus of claim 1, wherein the profile generator generates the speed profile in consideration of acceleration due to at least one of a rolling resistance, an air resistance, or a gradient resistance of the vehicle.

8. The vehicle control apparatus of claim 1, wherein the profile selector selects a speed profile, in which the vehicle is driving with minimum acceleration, from among the at least one speed profile.

9. The vehicle control apparatus of claim 1, wherein the controller terminates speed control according to the selected speed profile when the vehicle reaches a reference speed.

10. A vehicle system comprising:
   a sensor configured to detect an object around a vehicle;
   an information acquisition device configured to obtain map information and a location of the vehicle; and
   a vehicle control apparatus configured to control a speed of the vehicle depending on a speed profile, which is selected to satisfy a predetermined condition, from among at least one speed profile generated to include a hysteresis section in which acceleration and deceleration due to coasting of the vehicle are repeated, based on an environmental condition of the vehicle,
   wherein a vehicle control apparatus performs speed control including the coasting during a specific time when information about a forward situation for an autonomous driving of the vehicle is insufficient.

11. The vehicle system of claim 10, wherein the sensor obtains state information of the vehicle.

12. The vehicle system of claim 10, wherein the information acquisition device obtains the map information and the location of the vehicle from an external server.

13. A method of controlling a vehicle, the method comprising:
   generating at least one speed profile including a hysteresis section, in which deceleration and acceleration due to coasting of the vehicle are repeated, based on an environmental condition of the vehicle;
   selecting a speed profile, which satisfies a predetermined condition, from among the at least one speed profile;
   controlling a speed of the vehicle depending on the selected speed profile; and
   performing speed control including the coasting during a specific time when information about a forward situation for an autonomous driving of the vehicle is insufficient.

14. The method of claim 13, wherein the hysteresis section is a section in which deceleration and acceleration are repeated between a first speed limit and a second speed limit less than the first speed limit.

15. The method of claim 13, wherein the environmental condition of the vehicle includes object information around the vehicle, location information of the vehicle, and map information.

16. The method of claim 13, wherein the generating of the at least one speed profile includes:
   generating the speed profile so as to satisfy a speed limit condition set depending on surrounding situations of the vehicle.

17. The method of claim 13, wherein the generating of the at least one speed profile includes:
   generating the speed profile when an object is not present within a reference distance in front of the vehicle.

18. The method of claim 13, wherein the generating of the at least one speed profile includes:
   generating the speed profile when the vehicle reaches a reference speed.

19. The method of claim 13, wherein the generating of the at least one speed profile includes:
   generating the speed profile in consideration of acceleration due to at least one of a rolling resistance, an air resistance, or a gradient resistance of the vehicle.

20. The method of claim 13, wherein the selecting of the speed profile includes:
   selecting a speed profile, in which the vehicle is driving with minimum acceleration, from among the at least one speed profile.

* * * * *